United States Patent [19]
Wagner

[11] Patent Number: 6,107,955
[45] Date of Patent: Aug. 22, 2000

[54] RADAR SENSOR FOR A VEHICLE

[75] Inventor: Klaus-Peter Wagner, Stuttgart, Germany

[73] Assignee: Robert Bosch GmbH, Stuttgart, Germany

[21] Appl. No.: 09/194,369

[22] PCT Filed: Feb. 18, 1998

[86] PCT No.: PCT/DE98/00481

§ 371 Date: Nov. 24, 1998

§ 102(e) Date: Nov. 24, 1998

[87] PCT Pub. No.: WO98/52247

PCT Pub. Date: Nov. 19, 1998

[30] Foreign Application Priority Data

May 10, 1997 [DE] Germany ............ 197 19 764

[51] Int. Cl.[7] ............... G01S 13/93; G01S 7/28
[52] U.S. Cl. ............... 342/70; 342/175
[58] Field of Search ............. 342/70, 71, 72, 342/175; 343/700 MS

[56] References Cited

U.S. PATENT DOCUMENTS

| | | | |
|---|---|---|---|
| 2,895,131 | 7/1959 | Butler | 343/754 |
| 3,713,163 | 1/1973 | Keller et al. | 343/895 X |
| 4,243,991 | 1/1981 | Woodward | 343/777 |
| 4,899,164 | 2/1990 | McGrath | 343/754 |
| 5,218,374 | 6/1993 | Koert et al. | 343/789 |
| 5,451,969 | 9/1995 | Toth et al. | 343/781 CA |
| 5,455,589 | 10/1995 | Huguenin et al. | 342/175 |
| 5,512,901 | 4/1996 | Chen et al. | 342/175 |
| 5,680,139 | 10/1997 | Huguenin et al. | 342/175 |
| 5,877,726 | 3/1999 | Kudo et al. | 343/700 MS |
| 5,933,109 | 8/1999 | Tohya et al. | 342/175 |
| 5,949,365 | 9/1999 | Wagner | 342/70 |
| 5,952,973 | 9/1999 | Uematsu et al. | 343/700 MS |
| 5,977,904 | 11/1999 | Mizuno et al. | 342/70 |

FOREIGN PATENT DOCUMENTS 44 12 770 A1  10/1995  Germany .
196 42 810 C1  4/1998  Germany .

*Primary Examiner*—John B. Sotomayor
*Attorney, Agent, or Firm*—Michael J. Striker

[57] ABSTRACT

A compact, multi-beam motor vehicle radar sensor is described, which is placed in a housing, with an antenna arrangement consisting of a dielectric lens (15) and at least two first antenna feeds (161 to 163, 181 to 183), which are arranged along a first straight line (20) and form a first row of antenna feeds, wherein at least one further antenna feed (164 to 165, 184 to 185) is provided, which is arranged in such a way that at least one further row of antenna feeds is formed along a further straight line (21), wherein this further row can be congruently represented on the first row by a rotation around an imagined point of rotation (M). Such a motor vehicle radar sensor can be very simply and cost-effectively adapted to different installed positions.

10 Claims, 2 Drawing Sheets

RADAR SENSOR FOR A VEHICLE

BACKGROUND OF THE INVENTION

1. Field of the Invention

The present invention relates to a motor vehicle radar sensor having an antenna arrangenent consisting of a focusing means and at least two first antenna feeds, which are arranged along a first straight line and form a first row of antenna feeds.

2. Prior Art

This type of radar sensor is known from WO 97/02496, for example. A monostatic FMCW radar sensor for a vehicle for the detection of objects is proposed in this publication, wherein at least one antenna feed, together with a dielectric lens, is designed both for transmitting as well as receiving an appropriate echo signal. A radar sensor described in an exemplary embodiment has three antenna feeds which in this case are designed as so-called patch antennas. Each one of these antenna feeds is connected downstream with a signal processing circuit. Together with a common dielectric lens, the three antenna feeds form three distinctly marked antenna lobes, by means of which it is possible to determine the angular position of detected radar targets. The antenna feeds are arranged along a horizontal straight line at even distances from each other to determine a horizontal angular position, such as is required for the mentioned application. Difficulties now arise when adapting such a radar system to different vehicle types. Depending on the available space conditions on a vehicle, it may be necessary to mount the radar sensor, which itself is placed into a compact housing, in different installed positions. However, at the same time the said antenna feeds must be arranged exactly horizontally behind their common dielectric lens for determining a horizontal angular position. With a changed installed position of the radar sensor in a motor vehicle this requires an at least partial new construction of the antenna feeds in the housing of the radar sensor.

SUMMARY OF THE INVENTION

It is therefore the object of the present invention to disclose a multi-beam radar sensor in a compact housing, which can be simply and cost-effectively adapted to different installation environments, in particular to different installed positions.

This object is attained in accordance with the invention in that at least one further antenna feed is provided for a radar sensor of the species, which is arranged in such a way that at least one further row of antenna feeds is formed along a further straight line, wherein this further row can be represented congruently on the first row of the antenna feed by turning around an imagined point of rotation. Advantageous further developments of the invention ensue from the dependent claims, as well as from the exemplary embodiments described in what follows.

The advantage of the radar sensor in accordance with the invention lies in that an adaptation of the sensor to different installation conditions, in particular to different installation positions, is very simply and cost-effectively possible. At the same time, the invention itself can be realized very simply and cost-effectively, in particular if patch antennas, such as in the above described radar sensor, are employed. Since with the aid of commonly known methods such patch antennas are produced as a conductor structure on a support board, essentially only a change or adaptation of the respective layout of the support board is required. Further than that, the housing of the radar sensor itself can be optimized without regard of a required installed position. This makes the construction, which is difficult anyway, of such a compact radar sensor easier.

BRIEF DESCRIPTION OF THE DRAWING

The objects, features and advantages of the invention will now be illustrated in more detail with the aid of the following description of the preferred embodiments, with reference to the accompanying figures in which.

DESCRIPTION OF THE PREFERRED EMBODIMENTS

Figure 1:
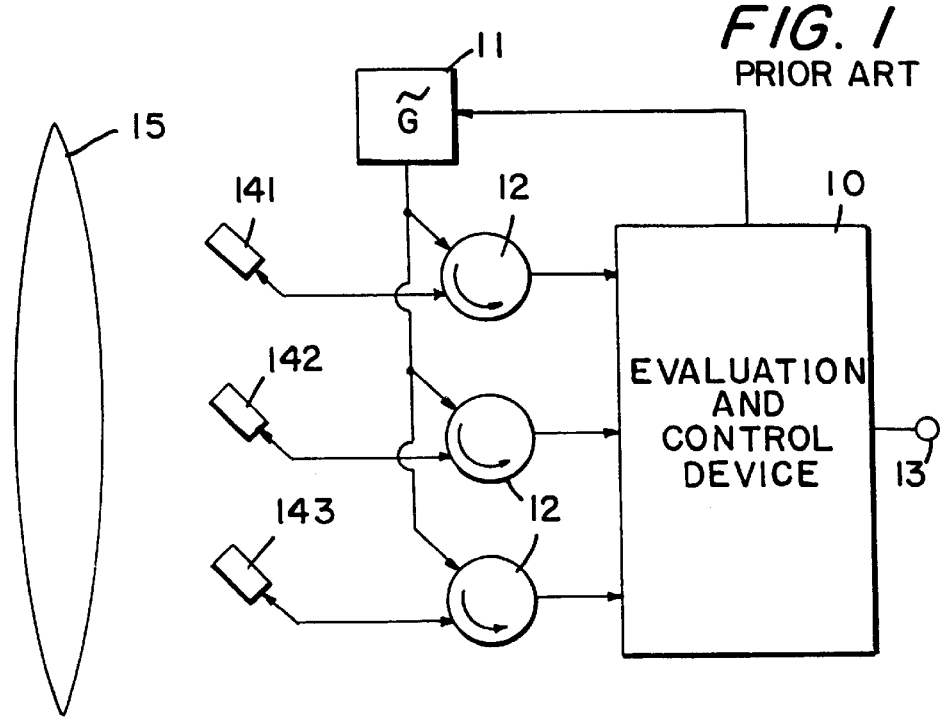
FIG. 1 is a schematic representation of a radar sensor in accordance with the prior art.

FIG. 1 shows a schematic representation of a radar sensor in accordance with the above mentioned prior art. Accordingly, three antenna feeds 141, 142 and 143, which in this case are designed as patch elements, are connected via a respective transmission/reception selector 12 with an evaluation and control device 10. Here, the evaluation and control device includes all signal processing circuits which are not otherwise mentioned and which a radar sensor of the species requires. The frequency of a controllable oscillator 11 is controlled by the evaluation and control device 10, and its output is connected with each one of the three transmission/reception selectors 12. This schematic design describes the structure of a triple-beam FMCW radar sensor. However, the invention is not limited to this basic structure. It can also be applied to any arbitrary multi-beam system, and further than that, also to pulse radar systems. It also is not important whether the radar sensor uses the antenna feeds simultaneously or sequentially in respect to each other. The design of the antenna feeds as patch element is advantageous in view of the very simple manufacture, however, it is not a necessary requirement for realizing the invention. The antenna feeds could also be designed as horn antennas, for example. A common dielectric lens 15 is arranged in front of the antenna feeds 141 to 143, which is used as a focusing medium. It, too, can be replaced by a reflector, for example, without changing the scope of the invention. The data or measured values detected by the radar sensor are made available to further components at an output 13. Within the framework of an automatic obstacle detection in a vehicle these are, for example, a warning device or a regulator for the automatic regulation of the speed of the vehicle. In accordance with the prior art, the radar sensor is placed into a compact housing, not represented here.

Figure 2:
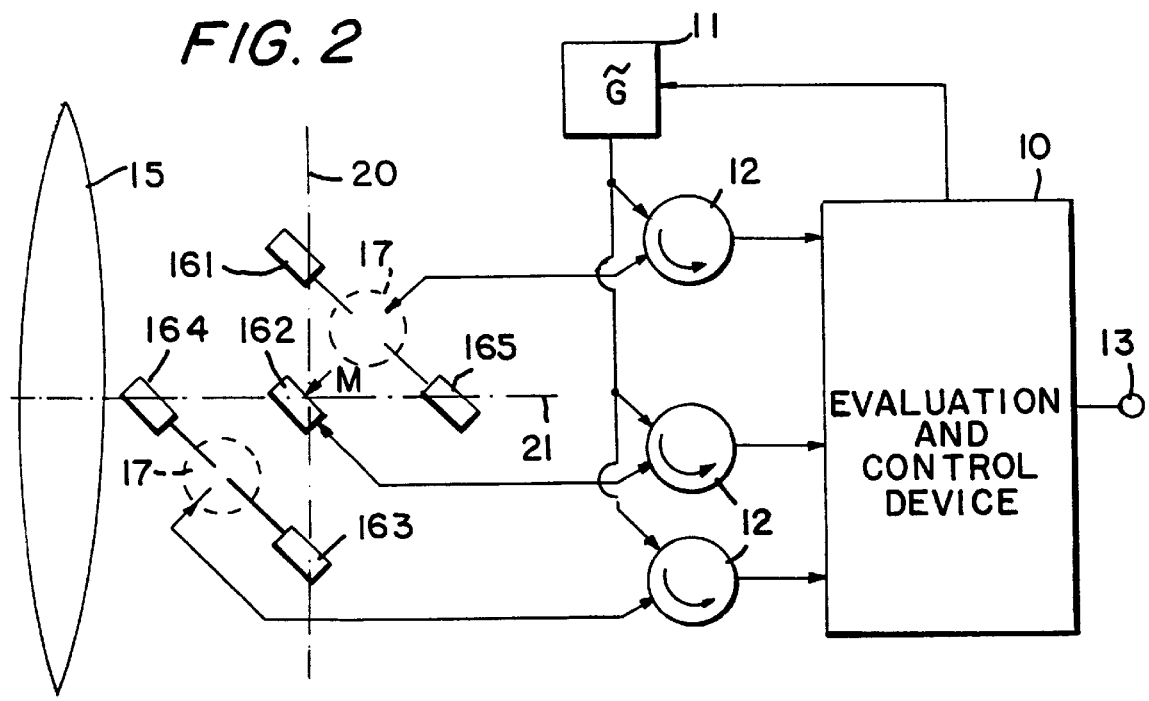
FIG. 2 is a schematic representation of a radar sensor in accordance with the invention.

FIG. 2 shows a first exemplary embodiment of the invention. It is based on the radar sensor in accordance with the prior art described in FIG. 1, and therefore contains, in the arrangement already described, an evaluation and control device 10, an oscillator 11, three transmission/reception selectors 12, a dielectric lens 15 and an output 13 of the evaluation and control device 10. However, in accordance with the invention there are now five antenna feeds 161, 162, 163, 164 and 165. As in FIG. 1, the antenna feeds 161 to 163 are arranged along a first straight line 20 and constitute a first row of antenna feeds. In accordance with the invention, the antenna feeds 164 and 165 are arranged along a second straight line 21 and, together with the antenna feed 162, they form a second straight line of antenna feeds. In this exemplary embodiment the straight lines 20 and 21 are perpendicular with respect to each other. Each one of the two rows of antenna feeds can be represented congruently on the respectively other row of antenna feeds by means of a rotation around a point of rotation M. In accordance with a preferred embodiment of the invention, the arrangement of the antenna feeds 161 to 165 here is such that the antenna feed 162 is located centered on this point of rotation M and accordingly is a member of both rows of antenna feeds. This arrangement of the antenna feeds in accordance with the invention makes it possible to mount the radar sensor in two different installed positions on a motor vehicle, but to still assure, that one row of antenna feeds is horizontally arranged. Respectively two of the total of five antenna feeds are then not required for operating the radar sensor. Depending on the installed position, these are either the antenna feeds 161 and 163, or the antenna feeds 164 and 165. Accordingly it is necessary, depending on the installed position selected, to connect either the antenna feeds 161 and 163, or the antenna feeds 164 and 165 with further signal processing circuits of the radar sensor. In the simplest case, the respectively other two antenna feeds remain without any further contact devices. But this is not a disadvantage when using patch antennas as antenna feeds, since no additional costs are incurred when providing additional antenna feeds. Only the layout of the support board to be produced must be correspondingly adapted.

The selection of respectively one of the two antenna feeds 161 and 165, or respectively 163 and 164, which are used alternatively with each other, takes place at connecting points 17, which have only been schematically indicated. The selection, or respectively the connection, can be realized in different production-technological ways. A first option, which is approximately represented in FIG. 2, consists in providing stub cables to the two alternatively used antenna feeds 161, 165 and 163, 164, as well as to the transmission/reception selectors 12, in the layout of the board containing the antenna feeds. The stub cables have been guided into close proximity at connecting points 17, but do not touch. The respectively selected antenna feed will be connected with the stub cable to the transmission/reception selector 12 in a final production process. This can be done, for example, by bonding. An alternative option is to design the layout of the support boards containing the antenna feeds in such a way, that the antenna feeds 161, 165 and 163, 164, which can be used alternatively in respect to each other, are respectively both connected with the downstream transmission/reception selector 12. The selection of the respectively actually used antenna feeds takes place in that in a final production step the respectively not needed antenna feed is isolated by a mechanical cutting of the connecting line to the transmission/reception selectors 12. A third option, which permits the making of a selection between the antenna feeds provided in alternation, even during the operation of the radar sensor, consists in providing a switch at each connecting point 17. For example, these could be high-frequency-capable PIN diode switches.

Figure 3:
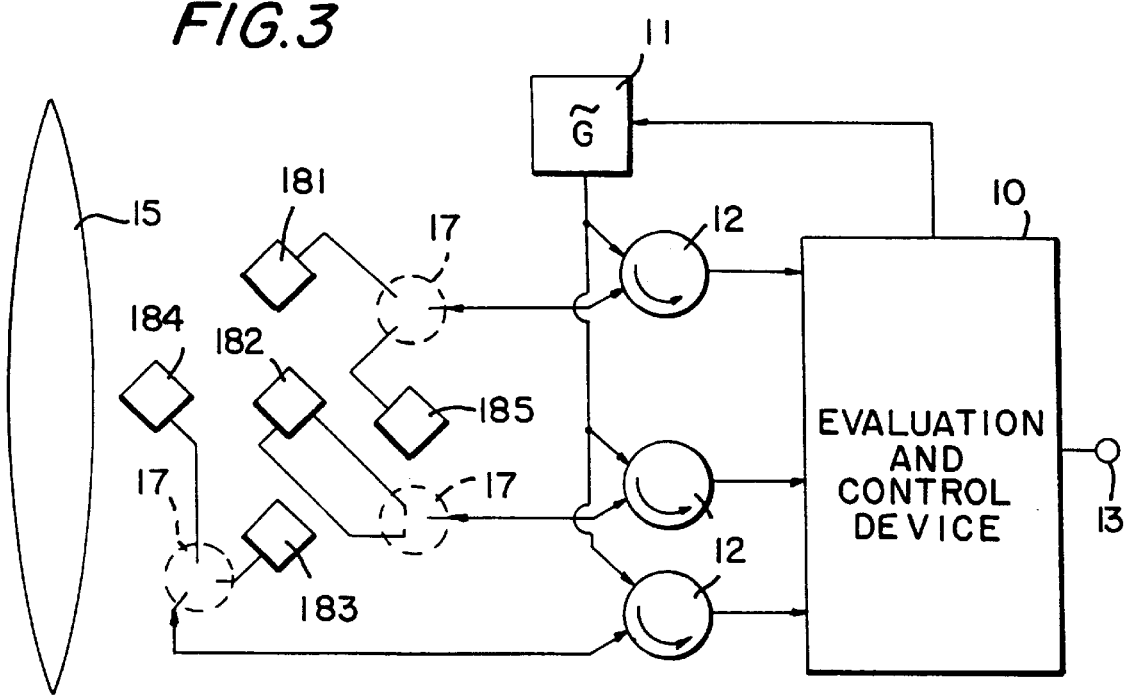
FIG. 3 is a schematic representation of another embodiment of a radar sensor in accordance with the invention.

However, a disadvantage of the radar sensor in accordance with the invention in FIG. 2 could possible be that the polarization direction of the used radar waves changes as a function of which row of antenna feeds is selected. In the present example the polarization direction in the one case would be inclined 45° toward the left, in the other case 45° to the right. This disadvantage is prevented by a radar sensor of the invention in accordance with the exemplary embodiment of FIG. 3. The representation of this radar sensor in accordance with the invention again contains the components, known from the prior art, of an evaluation and control device 10, an oscillator 11, a transmission/reception selector 12, an antenna lens 15 and an output 13 of the evaluation and control device 10. The difference with the radar sensor of the invention in accordance with FIG. 2 lies in that the antenna feeds employed in this example are designed as a square patch element. The polarization of the radar wave used in this case is determined by the side on which a connection line excites the patch element. In accordance with this the connecting lines to the antenna feeds 181 and 185 as well as 183 and 184, which are used alternatively in respect to each other, are provided on different sides. The selection of the respectively used antenna feed takes place in the same way as described in connection with FIG. 2. However, the novelty here is that the central antenna feed 182 has two supply lines which, as a function of the row of antenna feeds selected, can be contacted alternatively in respect to each other. Because of the square design of the patch elements, as well as the alternatively selectable supply at the antenna feed 182, it is possible to generate a polarization of 45° inclined to the left in both selectable installed positions.

Figure 4:
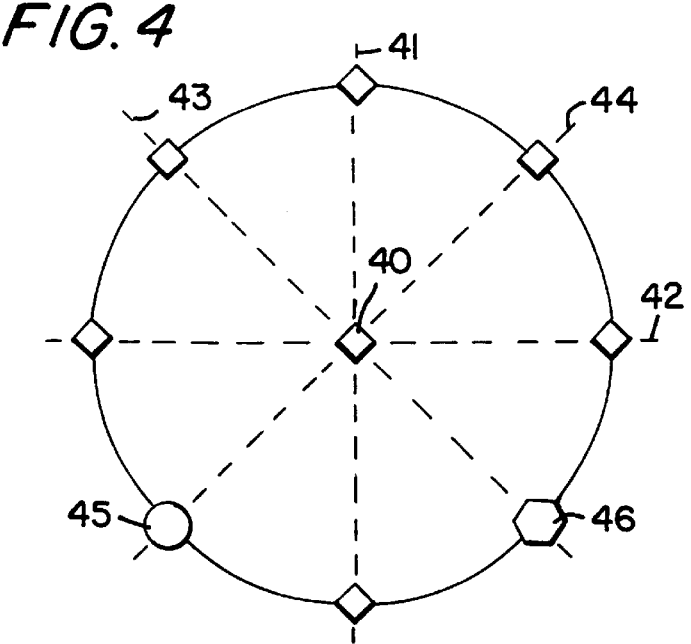
FIG. 4 is an arrangement of patch elements for explaining further developments of the invention.

FIG. 4 shows a view from above on a possible arrangement of antenna feeds in accordance with a further exemplary embodiment. In order to increase the number of alternatively available installed positions, further usable antenna feeds are provided, which are arranged along four straight lines 41, 42, 43 and 44. They form four rows of antenna feeds which can be alternatively selected. In accordance with the already mentioned advantageous embodiment of the invention, the antenna feed 40 is again located on an imagined point of rotation M. Each one of the rows of antenna feeds can be congruently represented on respectively other rows by a rotation around this imagined point of rotation M. A radar sensor with such an arrangement of antenna feeds can be mounted in four different installed positions, each of which is located turned by 45° in respect to the others. If furthermore it is taken into consideration within the scope of signal processing that possibly a right and a left antenna feed are exchanged laterally reversed, even a total of eight different installed positions can be selected. In order to represent further alternative embodiments of the invention, an antenna feed 45 is represented in the shape of a circle, and another antenna feed 46 in an octagonal shape. These shapes, as well as other shapes which can possibly be empirically determined, might under certain circumstances be necessary for assuring a respectively equal polarization direction even with this number of alternatives.

The described exemplary embodiments represent the preferred embodiments of the invention. However, it is also conceivable that the antenna feeds which are used alternatively in respect to each other extend along two straight lines which are at an arbitrarily selectable angle in respect to each other. It is not necessary here that one antenna feed be a part of several rows of antenna feeds. In the last mentioned case, none of the antenna feeds would be located for a congruent representation on a point of rotation to be imagined. If a switch is used for selecting the antenna feeds which are respectively used alternatively, there is of course the option of switching back and forth between the different antenna feeds even with the radar sensor in operation. When using the radar sensor in connection with a motor vehicle, this can be used particularly advantageously for a vertical adjustment of the radar sensor in that a vertical angular position of a radar target, which can then be determined by the radar sensor, is compared with a command value.

What is claimed is:

1. A motor vehicle radar sensor, having an antenna arrangement consisting of a focusing means (15) and at least two first antenna feeds (161 to 163, 181 to 183), which are arranged along a first straight line (20) and form a first row of antenna feeds, wherein at least one further antenna feed (164 to 165, 184 to 185) is provided, which is arranged in such a way that at least one further row of antenna feeds is formed along a further straight line (21), wherein this further row can be congruently represented on the first row by a rotation around an imagined point of rotation (M).

2. The motor vehicle radar sensor in accordance with claim 1, wherein one antenna feed of the first row (162, 182, 40) also is a component of each further row of antenna feeds, and therefore constitutes the imagined turning point for the congruent representation of the further rows on the first row.

3. The motor vehicle radar sensor in accordance with claim 2, wherein each row has an odd number of at least three antenna feeds, and that the antenna feed (162, 182, 40) representing the imagined point of rotation is the center antenna element of each row.

4. The motor vehicle radar sensor in accordance with claim 1, wherein at least one of the further rows of antenna feeds is arranged along a straight line (42), which extends vertically in respect to the first straight line (41).

5. The motor vehicle radar sensor in accordance with claim 4, wherein at least one of the further rows of antenna feeds is arranged along a straight line (43), which extends at an angle of 45° in respect to the first straight line (41).

6. The motor vehicle radar sensor in accordance with claim 1, wherein the antenna feeds of only one row are electrically connected with signal processing circuits of the radar sensor.

7. The motor vehicle radar sensor in accordance with claim 6, wherein the said antenna feeds are electrically connected with the signal processing circuits by bonding at the connecting points (17).

8. The motor vehicle radar sensor in accordance with claim 6, wherein the antenna feeds of the other rows are separated from the signal processing circuits of the radar sensor by interrupting originally provided line connections.

9. The motor vehicle radar sensor in accordance with claim 1, wherein switches are provided at the connecting points (17), by means of which antenna feeds of different rows can be alternatively connected with the signal processing circuits of the radar sensor.

10. The motor vehicle radar sensor in accordance with claim 1, wherein the individual antenna feeds have a square (40), octagonal (46) or circular (45) aperture.

* * * * *